United States Patent
Soliman et al.

(10) Patent No.: US 11,209,842 B1
(45) Date of Patent: Dec. 28, 2021

(54) PRESSURE SURGE AND WATER HAMMER MITIGATION DEVICE AND METHOD

(71) Applicant: SAUDI ARABIAN OIL COMPANY, Dhahran (SA)

(72) Inventors: Mohamed Ahmed Soliman, Ras Tanura (SA); Samusideen Adewale Salu, Ras Tanura (SA); Ali Homoud Hassan Alshehri, Tabouk (SA)

(73) Assignee: SAUDI ARABIAN OIL COMPANY

( * ) Notice: Subject to any disclaimer, the term of this patent is extended or adjusted under 35 U.S.C. 154(b) by 0 days.

(21) Appl. No.: 16/915,881

(22) Filed: Jun. 29, 2020

(51) Int. Cl.
*G05D 16/20* (2006.01)
*F16K 5/06* (2006.01)

(52) U.S. Cl.
CPC ....... *G05D 16/2033* (2013.01); *F16K 5/0605* (2013.01)

(58) Field of Classification Search
CPC ........ F16K 47/045; F16K 5/0605; F16K 5/10; F16K 5/12; G05D 16/2026; G05D 16/2033; G05D 16/208; Y10T 137/0379; Y10T 137/0396; Y10T 137/85986
See application file for complete search history.

(56) References Cited

U.S. PATENT DOCUMENTS

| | | | |
|---|---|---|---|
| 2,950,682 A * | 8/1960 | Kimmel | F16L 55/00 137/12 |
| 3,911,941 A | 10/1975 | Gerbic et al. | |
| 4,130,128 A | 12/1978 | Kaneko | |
| 4,212,321 A * | 7/1980 | Hulsey | F16K 5/0605 137/625.32 |
| 4,261,387 A | 4/1981 | Cohn | |
| 4,340,079 A | 7/1982 | Smith et al. | |
| 4,479,510 A | 10/1984 | Bey | |
| 5,269,341 A * | 12/1993 | Nusz | G05D 16/2033 137/12 |
| 5,944,055 A | 8/1999 | Dicky | |
| 7,284,563 B2 | 10/2007 | Partridge et al. | |
| 7,448,410 B2 | 11/2008 | Keiser | |

(Continued)

FOREIGN PATENT DOCUMENTS

| | | |
|---|---|---|
| CN | 201396578 Y | 2/2010 |
| DE | 2017636 A1 | 11/1971 |

(Continued)

OTHER PUBLICATIONS

Budris, "Damage control: Avoiding destructive water hammer conditions", Water World, 2014, pp. 1-6.

(Continued)

*Primary Examiner* — Hailey K. Do
(74) *Attorney, Agent, or Firm* — Bracewell LLP; Constance Gall Rhebergen

(57) ABSTRACT

Embodiments provide a surge suppression device, a surge suppression system, and methods for operating the same. The surge suppression device includes a valve body and a plug. The plug is rotatably positioned in a hollow space of the valve body. The plug includes two surge suppression openings defining a fluid flow directed to surge suppression. Each of the two surge suppression openings includes a circular plate having a plurality of orifices. The plurality of orifices allows reduction of surge pressure when the water passes the first fluid flow path. The circular plate has a concave or convex geometry.

27 Claims, 7 Drawing Sheets

(56) References Cited

U.S. PATENT DOCUMENTS

| | | | |
|---|---|---|---|
| 10,222,812 B2 | 3/2019 | Shu | |
| 2001/0045231 A1 | 11/2001 | Monod | |
| 2005/0199286 A1* | 9/2005 | Appleford | F17D 3/00 |
| | | | 137/487.5 |
| 2010/0163774 A1* | 7/2010 | Rimboym | F16K 5/0605 |
| | | | 251/315.01 |
| 2013/0038062 A1* | 2/2013 | Salu | F03G 7/00 |
| | | | 290/52 |
| 2014/0290753 A1* | 10/2014 | Grimstad | E21B 33/0355 |
| | | | 137/14 |
| 2016/0215778 A1 | 7/2016 | Nohmi | |

FOREIGN PATENT DOCUMENTS

| | | |
|---|---|---|
| DE | 102015013696 A1 | 4/2017 |
| GB | 945367 A | 12/1963 |
| JP | S5837400 S | 3/1983 |
| JP | H058139 U | 2/1993 |
| WO | 2019148144 A1 | 8/2019 |

OTHER PUBLICATIONS

Mokveld, "Surge relief valves", Brochure, pp. 1-12.
PCTUS2021070784 International Search Report and Written Opinion dated Oct. 18, 2021, 15 pgs.

* cited by examiner

PRESSURE SURGE AND WATER HAMMER MITIGATION DEVICE AND METHOD

BACKGROUND

Field of the Disclosure

Embodiments of the disclosure generally relate to mitigating pressure surges. More specifically, embodiments of the disclosure relate to a device, system, and method for mitigating pressure surges in a water or steam pipeline system.

Description of the Related Art

In upstream oil and gas operations, water is frequently transported to and from the production facilities via various pipelines. For example, water can be produced from the hydrocarbon reservoir as a byproduct, where the produced wild crude (which is a mixture of crude and water) is transported from satellite gas oil separation plants (GOSPs) and other gathering systems to a nearby surface processing facility via pipelines. In addition, water can be introduced into the hydrocarbon reservoir for secondary oil recovery or storage purposes. During such water transport, transient pressure waves and surges can be generated when an upset operating scenario occurs, such as pump trips, fast valve closures, or emergency shutdowns. These transient events can introduce excessive pressure forces and rapid fluid accelerations into the pipeline distribution system. The generated excessive pressure forces can exceed the pressure limits of the pipeline system, causing rupture, movement, deformation, or severe vibration to the pipeline. Conversely, excessive pressure deficits, or even negative pressure forces, can be created by, for example, vapor column collapses, resulting in buckling, implosion, or leakage at pipe joints or stripping of internal coating of the pipeline.

SUMMARY

Embodiments of the disclosure generally relate to mitigating pressure surges. More specifically, embodiments of the disclosure relate to a device, system, and method for mitigating pressure surges in a water or steam pipeline system.

Embodiments of the disclosure provide a surge suppression system for transporting water through a pipeline. The surge protection system includes a water feed, a pump, a first surge suppression device, a second surge suppression device, a water sink, and a surge controller. The pump is fluidly connected downstream of the water feed. The first surge suppression device is fluidly connected downstream of the pump. The second surge suppression device is fluidly connected downstream of the first surge suppression device via the pipeline. The water sink is fluidly connected downstream of the second surge suppression device. The surge controller is electronically connected to the pump, the first surge suppression device, and the second surge suppression device. The surge controller is configured to receive a shutdown signal from the pump. The surge controller is configured to transmit an operation signal to the first surge suppression device and the second surge suppression device such that each of the first surge suppression device and the second surge suppression device is remotely switched between a normal operation mode and a surge suppression mode.

In some embodiments, each of the first surge suppression device and the second surge suppression device includes a valve body and a plug. The valve body includes a substantially spherical hollow space. The plug is substantially spherical and rotatably positioned in the substantially spherical hollow space of the valve body. The plug includes two surge suppression openings. The two surge suppression openings define a first fluid flow path corresponding to the surge suppression mode. In some embodiments, the plug further includes two full-bore openings. The two full-bore openings define a second fluid flow path corresponding to the normal operation mode. In some embodiments, the first fluid flow path and the second fluid flow path are switchable by rotating the plug in a 90 degree interval. In some embodiments, each of the two surge suppression openings includes a circular plate having a plurality of orifices. The plurality of orifices allows reduction of surge pressure when the water passes the first fluid flow path. In some embodiments, the circular plate has a concave or convex geometry. In some embodiments, each of the first surge suppression device and the second surge suppression device further includes a stem. The stem is fixedly connected to the plug. The plug is rotatable along an axis extending through a center of the stem.

In some embodiments, the surge suppression system further includes a shutdown valve. The shutdown valve is fluidly connected downstream of the pump and upstream of the first surge suppression device. The surge controller is electronically connected to the shutdown valve and configured to receive a shutdown signal from the shutdown valve. In some embodiments, the surge suppression system further includes a well isolation valve. The well isolation valve is fluidly connected downstream of the second surge suppression device and upstream of the water sink. The surge controller is electronically connected to the well isolation valve and configured to receive a shutdown signal from the well isolation valve. In some embodiments, the surge suppression system further includes a wellhead. The wellhead is fluidly connected downstream of the second surge suppression device and upstream of the water sink. The surge controller is electronically connected to the wellhead and configured to receive a shutdown signal from the wellhead. In some embodiments, the surge suppression system further includes a scraper launcher and a scraper detector. The scraper launcher is fluidly and peripherally connected to the pipeline. The scraper launcher is configured to launch a scraper into the pipeline during the normal operation mode for a scraping operation. The scraper detector is configured to transmit a scraping signal to the surge controller as the scraper passes the scraper detector.

Embodiments of the disclosure also provide a method for controlling a pressure surge during water transport through a pipeline. The method includes the step of detecting, via a surge controller, a shutdown signal provided by a pump. The pump is fluidly connected downstream of a water feed. The method includes the step of transmitting, via the surge controller, an operational signal to a first surge suppression device and a second surge suppression device such that each of the first surge suppression device and the second surge suppression device is remotely switched from a normal operation mode to a surge suppression mode. The first surge suppression device is fluidly connected downstream of the pump. The second surge suppression device is fluidly connected downstream of the first surge suppression device via the pipeline. A water sink is fluidly connected downstream of the second surge suppression device.

In some embodiments, each of the first surge suppression device and the second surge suppression device includes a valve body and a plug. The valve body includes a substantially spherical hollow space. The plug is substantially spherical and rotatably positioned in the substantially spherical hollow space of the valve body. The plug includes two surge suppression openings. The two surge suppression openings define a first fluid flow path corresponding to the surge suppression mode. In some embodiments, the plug further includes two full-bore openings. The two full-bore openings define a second fluid flow path corresponding to the normal operation mode. In some embodiments, the first fluid flow path and the second fluid flow path are switchable by rotating the plug in a 90 degree interval. In some embodiments, each of the two surge suppression openings includes a circular plate having a plurality of orifices. The plurality of orifices allows reduction of surge pressure when the water passes the first fluid flow path. In some embodiments, the circular plate has a concave or convex geometry. In some embodiments, each of the first surge suppression device and the second surge suppression device further includes a stem. The stem is fixedly connected to the plug. The plug is rotatable along an axis extending through a center of the stem.

In some embodiments, the detecting step further includes detecting a shutdown signal provided by a shutdown valve. The shutdown valve is fluidly connected downstream of the pump and upstream of the first surge suppression device. In some embodiments, the detecting step further includes detecting a shutdown signal provided by a well isolation valve. The well isolation valve is fluidly connected downstream of the second surge suppression device and upstream of the water sink. In some embodiments, the detecting step further includes detecting a shutdown signal provided by a wellhead. The wellhead is fluidly connected downstream of the second surge suppression device and upstream of the water sink. In some embodiments, the method further includes the step of transmitting, via the surge controller, an operational signal to the first surge suppression device and the second surge suppression device such that each of the first surge suppression device and the second surge suppression device is remotely switched from the surge suppression mode to the normal operation mode.

Embodiments of the disclosure also provide a method for mitigating a pressure surge during water transport through a pipeline. The method includes the step of detecting the pressure surge in the pipeline. The method includes the step of suppressing the pressure surge using an in-line surge suppression device. The in-line surge suppression device includes a valve body and a plug. The valve body includes a substantially spherical hollow space. The plug is substantially spherical and rotatably positioned in the substantially spherical hollow space of the valve body. The plug includes two surge suppression openings. The two surge suppression openings define a first fluid flow path. Each of the two surge suppression openings includes a circular plate having a plurality of orifices. The plurality of orifices is configured to allow reduction of the surge when water passes the first fluid flow path. Fluid flow rate is maintained due to an increase of differential pressure across the plurality of orifices.

In some embodiments, the plug further includes two full-bore openings. The two full-bore openings defining a second fluid flow path. In some embodiments, the suppressing step includes rotating the plug in a 90 degree interval such that the second fluid flow path is switched to the first fluid flow path. In some embodiments, the circular plate has a concave or convex geometry. In some embodiments, the in-line surge suppression device further includes a stem. The stem is fixedly connected to the plug. The plug is rotatable along an axis extending through a center of the stem.

BRIEF DESCRIPTION OF THE DRAWINGS

So that the manner in which the previously-recited features, aspects, and advantages of the embodiments of this disclosure as well as others that will become apparent are attained and can be understood in detail, a more particular description of the disclosure briefly summarized previously may be had by reference to the embodiments that are illustrated in the drawings that form a part of this specification. However, it is to be noted that the appended drawings illustrate only certain embodiments of the disclosure and are not to be considered limiting of the disclosure's scope as the disclosure may admit to other equally effective embodiments.

Figure 1:
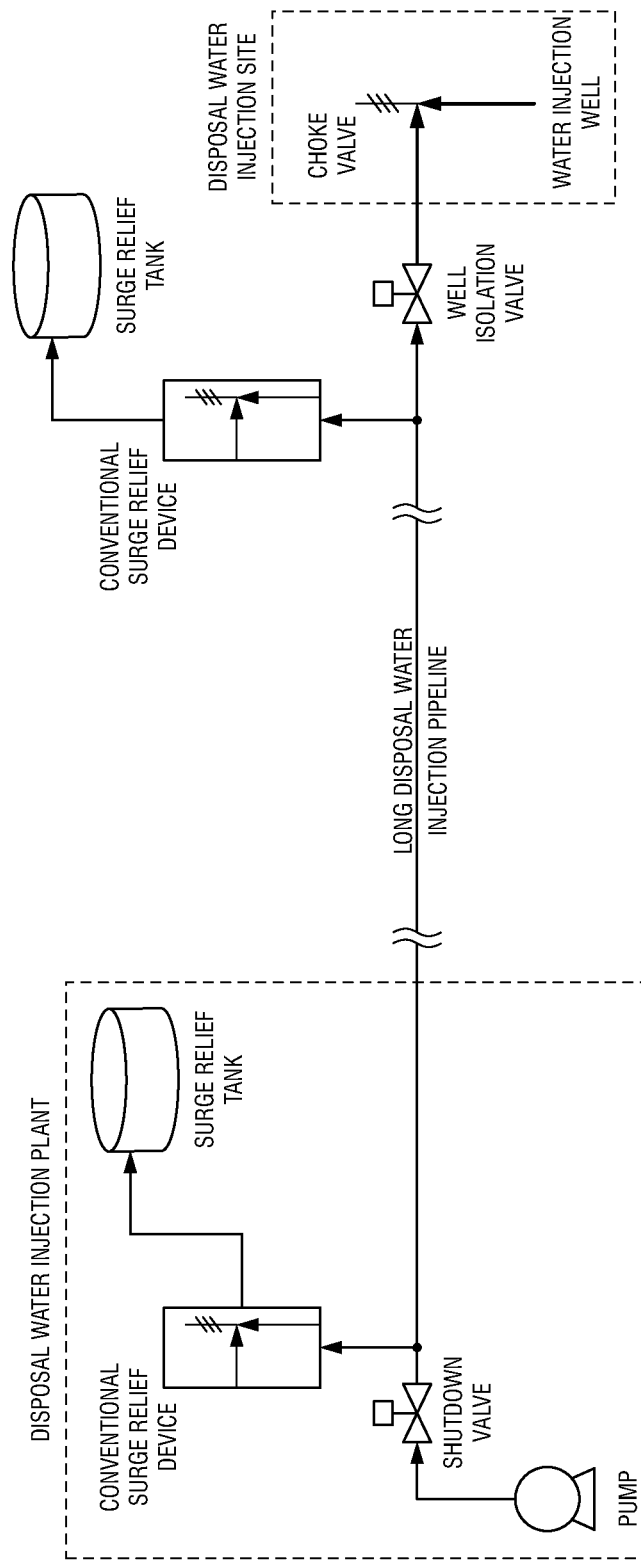
FIG. 1 is a schematic diagram of a conventional surge suppression system.

In the accompanying Figures, similar components or features, or both, may have a similar reference label.

DETAILED DESCRIPTION

The disclosure refers to particular features, including process or method steps. Those of skill in the art understand that the disclosure is not limited to or by the description of embodiments given in the specification. The subject matter of this disclosure is not restricted except only in the spirit of the specification and appended claims.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

Although the disclosure has been described with respect to certain features, it should be understood that the features and embodiments of the features can be combined with other features and embodiments of those features.

Although the disclosure has been described in detail, it should be understood that various changes, substitutions, and alternations can be made without departing from the principle and scope of the disclosure. Accordingly, the scope of the present disclosure should be determined by the following claims and their appropriate legal equivalents.

As used throughout the disclosure, the singular forms "a," "an," and "the" include plural references unless the context clearly indicates otherwise.

As used throughout the disclosure, the word "about" includes +/−5% of the cited magnitude.

As used throughout the disclosure, the words "comprise," "has," "includes," and all other grammatical variations are each intended to have an open, non-limiting meaning that does not exclude additional elements, components or steps. Embodiments of the present disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

As used throughout the disclosure, the words "optional" or "optionally" means that the subsequently described event or circumstances can or may not occur. The description includes instances where the event or circumstance occurs and instances where it does not occur.

Where a range of values is provided in the specification or in the appended claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended claims to a method comprising two or more defined steps, the defined steps can be carried out in any order or simultaneously except where the context excludes that possibility.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

As used throughout the disclosure, spatial terms described the relative position of an object or a group of objects relative to another object or group of objects. The spatial relationships apply along vertical and horizontal axes. Orientation and relational words are for descriptive convenience and are not limiting unless otherwise indicated.

As used throughout the disclosure, the terms "surge," "pressure surge," "fluid hammer," "water hammer," "hydraulic shock," "transient pressure wave," "transient pressure surge" are used interchangeably.

Embodiments of the disclosure relate to a device, system, and method for mitigating pressure surges and hydraulic shocks in a liquid or steam pipeline system. The surge suppression device has a configuration resembling a ball valve. The surge suppression device has two linear fluid flow paths. A spherically shaped plug (corresponding to a ball of a conventional ball valve) of the device has four openings separated by 90 degrees from one another. Two of the openings are full-bore openings on opposite ends, corresponding to one of the two linear fluid flow paths (normal operation mode). Each of the other two openings includes a substantially circular plate having one or more orifices of various sizes on opposite ends, corresponding to the other of the two linear fluid flow paths (surge suppression mode). The surge suppression device can be maintained in normal operation mode during normal operation or during a scraping operation. The surge suppression device can be switched to surge suppression mode when a pressure surge is detected or is likely to happen. Advantageously, the full-bore openings allow scraping of the pipeline without any hindrance and the orifice-based openings allow reducing the magnitude of a pressure shock wave resulting in minimizing pressure surges. In addition, the surge suppression device can be utilized to mitigate water or steam hammering in a steam/condensate pipeline system.

Water hammering, pressure surge, or transient pressure occurs when fluid flowing in a pipeline is suddenly stopped as a result of events such as pump tripping, pump startup, sudden valve closure, or stuck scrapers. The kinetic energy of the flowing fluid is converted to pressure energy creating an acoustic pressure wave travelling at the speed of sound of the fluid (for example, 1,450 to 1,500 meters per second). The magnitude and duration of the generated transient pressure depends on the fluid velocity, pipeline material, and boundary conditions of the pipeline system, such as tanks, pumps, air valves, control valves, and changes in pipeline diameter. The sudden increase of pressure may cause rupture or damage to the pump, piping, or fittings.

The pressure surge of a simple piping system can be estimated using the Joukowsky equation as shown in Formula (1):

$$\Delta H = \frac{c}{g} \Delta v \qquad (1)$$

where H is the head pressure, c is the wave velocity, g is the gravitational force, and v is the fluid velocity. When a fluid in motion is forced to a sudden stop or change of direction, a pressure wave can be generated and propagated through the fluid. Such pressure wave is known in the art as a fluid hammer, water hammer, pressure surge, or hydraulic shock.

To mitigate, minimize, or prevent the formation of such transient flow regimes (that is, pressure surges), it would be advantageous and cost effective to install an in-line surge suppression device than using conventional surge suppression devices such as surge relief valves, bladder-type surge accumulator devices, and surge relief tank systems, as shown for example in FIG. 1, all of which are installed peripheral and external to the pipeline. In addition, the in-line surge suppression device requires minimum maintenance, where internal fluids are not relieved to the exterior of the pipeline system. External surge-handling equipment (as shown for example in FIG. 1) are not necessary to be installed peripheral to the pipeline system.

Figure 2A:
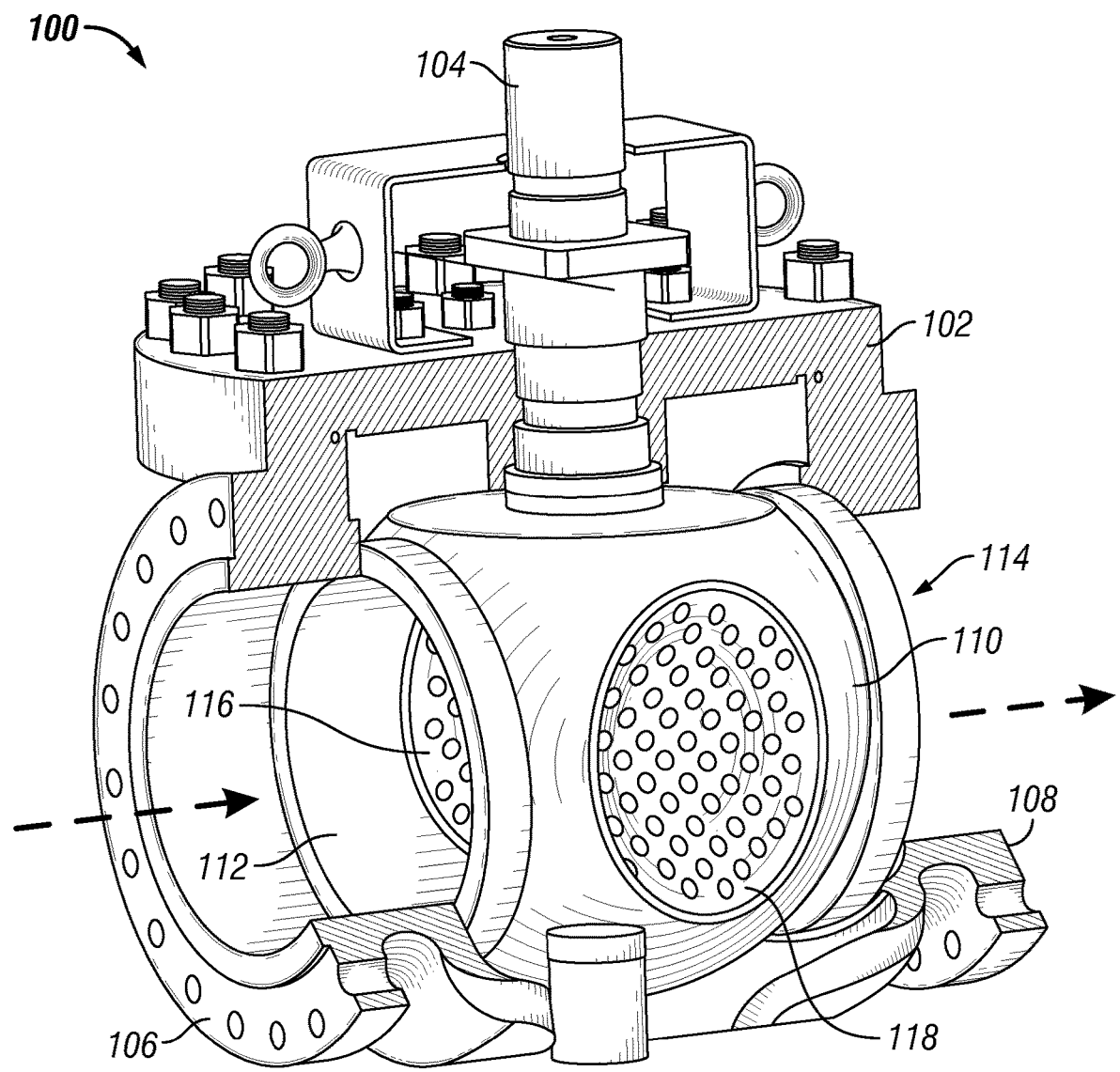
FIG. 2A is a perspective sectional view of a surge suppression device in a normal operation mode or scraping mode, according to an embodiment of the disclosure.
Figure 2B:
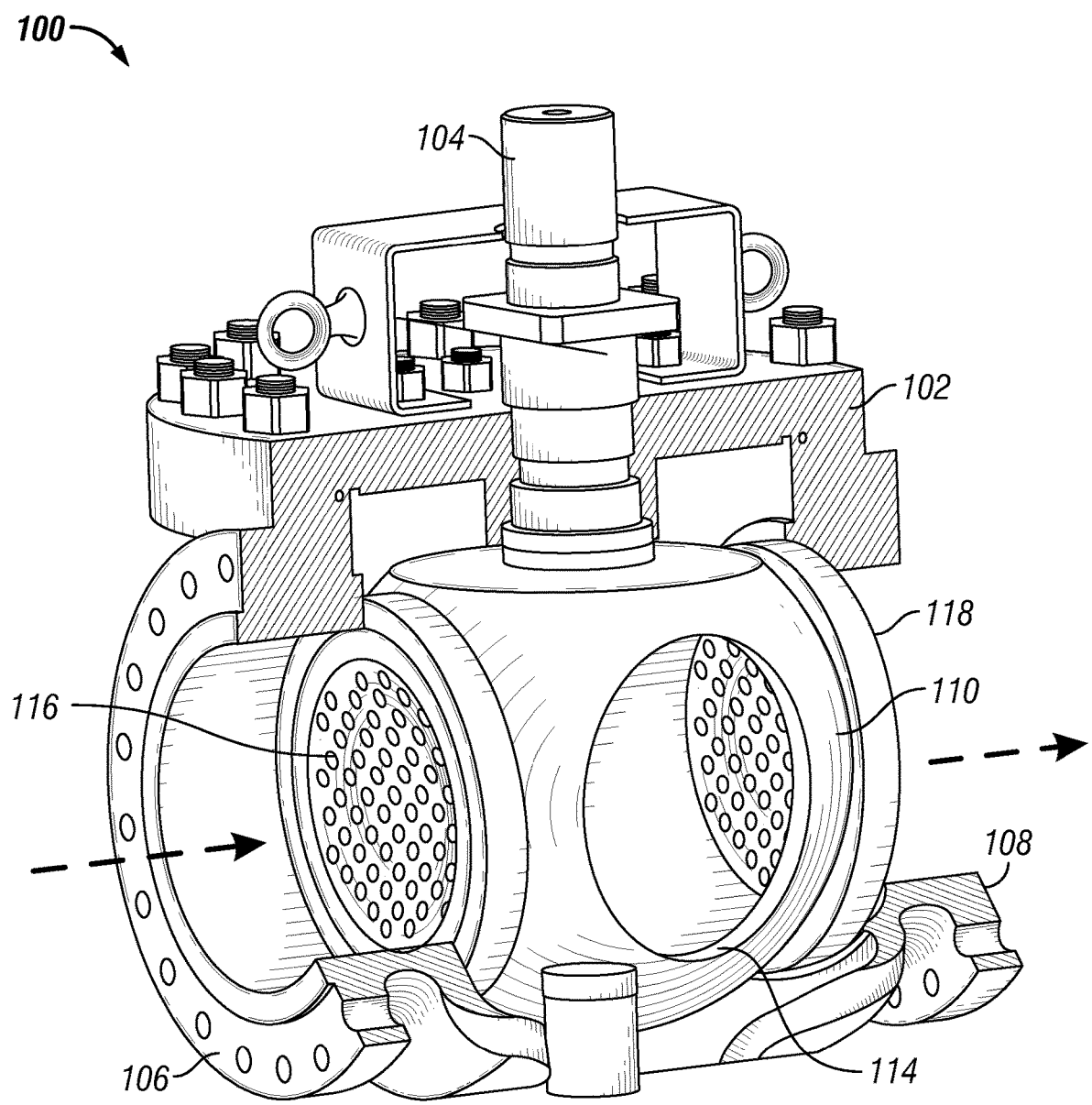
FIG. 2B is a perspective sectional view of a surge suppression device in a surge suppression mode, according to an embodiment of the disclosure.

FIG. 2A shows a perspective sectional view of a surge suppression device 100 in a normal operation mode or scraping mode, according to an embodiment of the disclosure. FIG. 2B shows a perspective sectional view of a surge suppression device 100 in a surge suppression mode, according to an embodiment of the disclosure. A linear fluid flow path (shown as the thick arrow) extends through the longitudinal axis of the surge suppression device 100. The surge suppression device 100 includes a substantially spherically shaped plug 110 rotatably positioned in a substantially spherically shaped hollow space of a valve body 102. The plug 110 is rotatable along a transverse axis extending through the center of a stem 104. The lower end of the stem 104 is fixedly connected to the plug 110. Optionally, an actuator (not shown) can be coupled to the upper end of the stem 104 to cause rotation of the stem 104, either in the clockwise or counterclockwise direction. The rotation of the stem 104 can be in a 45 degree or 90 degree interval.

The valve body 102 includes two flanges 106, 108 for connecting the surge suppression device 100 to external piping (not shown) with mating flanges. The two flanges 106, 108 have substantially the same inner diameter. One skilled in the art would recognize that the surge suppression device 100 can be in the absence of flanges. In some embodiments, the inlet and outlet of the surge suppression device 100 can be internally threaded or externally threaded for connecting the surge suppression device 100 to external piping (not shown) with mating threads. In some embodiments, the inlet and outlet of the surge suppression device 100 can be connected to external piping (not shown) via compression fittings or any other suitable coupling means.

Figure 2C:
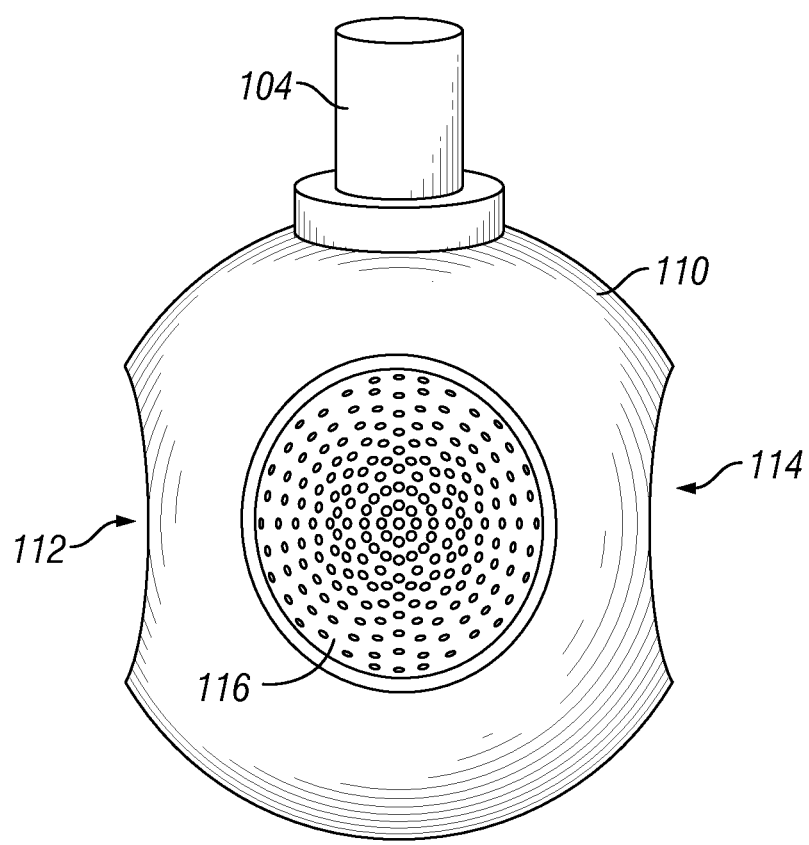
FIG. 2C is a perspective view of a plug of the surge suppression device, according to an embodiment of the disclosure.

FIG. 2C shows a perspective view of the plug 110, according to an embodiment of the disclosure. The plug 110 can include corrosion resistant and abrasion resistant material, such as stainless steel. The plug 110 includes two full-bore openings 112, 114 and two surge suppression openings 116, 118. The two full-bore openings 112, 114 are positioned opposite to each other. Each of the two full-bore openings 116, 118 has substantially the same diameter as of the inner diameter of the two flanges 106, 108. The two full-bore openings 112, 114 correspond to a fluid flow path used during normal operation. The two surge suppression openings 116, 118 are also positioned opposite to each other, but are positioned at about 90 degrees (along the transverse axis) apart from the two full-bore openings 112, 114. The two surge suppression openings 116, 118 correspond to a fluid flow path used when a pressure surge is detected or a pressure surge is likely to happen. In this manner, the surge suppression device 100 can be switched between normal operation mode and surge suppression mode by rotating the stem 104 at about a 90 degree interval, either clockwise or counterclockwise.

Each of the two surge suppression openings 116, 118 includes a substantially circular plate having a plurality of orifices. The circular plate has substantially the same diameter as of the inner diameter of the two flanges 106, 108. In some embodiments, the circular plate has a concave or convex geometry along the longitudinal axis. The number and size of each orifice included in the circular plate can vary depending on the estimated pressure and flow of the fluid passing within the pipeline and the maximum pressure drop allowed during normal operation.

The existence of the orifices allows reduction of surge pressure when the fluid passes the two surge suppression openings 116, 118. Without being bound by any theory, the increased pressure due to the pressure surge causes an increase to the available differential pressure across the orifice. The fluid flow rate can be maintained by increasing the differential pressure across the orifice according to the general liquid orifice equation as shown in Formula (2):

$$Q = c \cdot d^2 \sqrt{\frac{\Delta P}{\rho}} \quad (2)$$

where Q is the volumetric flow rate, c is a constant, d is the diameter of the orifice, ΔP is the differential pressure across the orifice, and p is the liquid density (or specific gravity).

Advantageously, the fluid flow rate can be maintained when the fluid passes the two surge suppression openings 116, 118 during a pressure surge.

In some embodiments, multiple surge suppression devices 100 can be installed along a pipeline at various locations separated by various distances. The length of the pipeline can be less than about 1,000 kilometers (km), alternately less than about 100 km, alternately less than about 10 km, alternately less than about 1 km, or alternately less than about 100 m.

In some embodiments, the surge suppression device 100 can be retrofitted by replacing an existing ball of an in-line ball valve with the plug 110.

In some embodiments, the surge suppression device 100 can be set to normal operation mode to conduct a scraping operation where scrapers or pipeline pigs are able to pass through the two full-bore openings 112, 114. Advantageously, the scraping operation can be conducted without removal of the circular plates.

Figure 3:
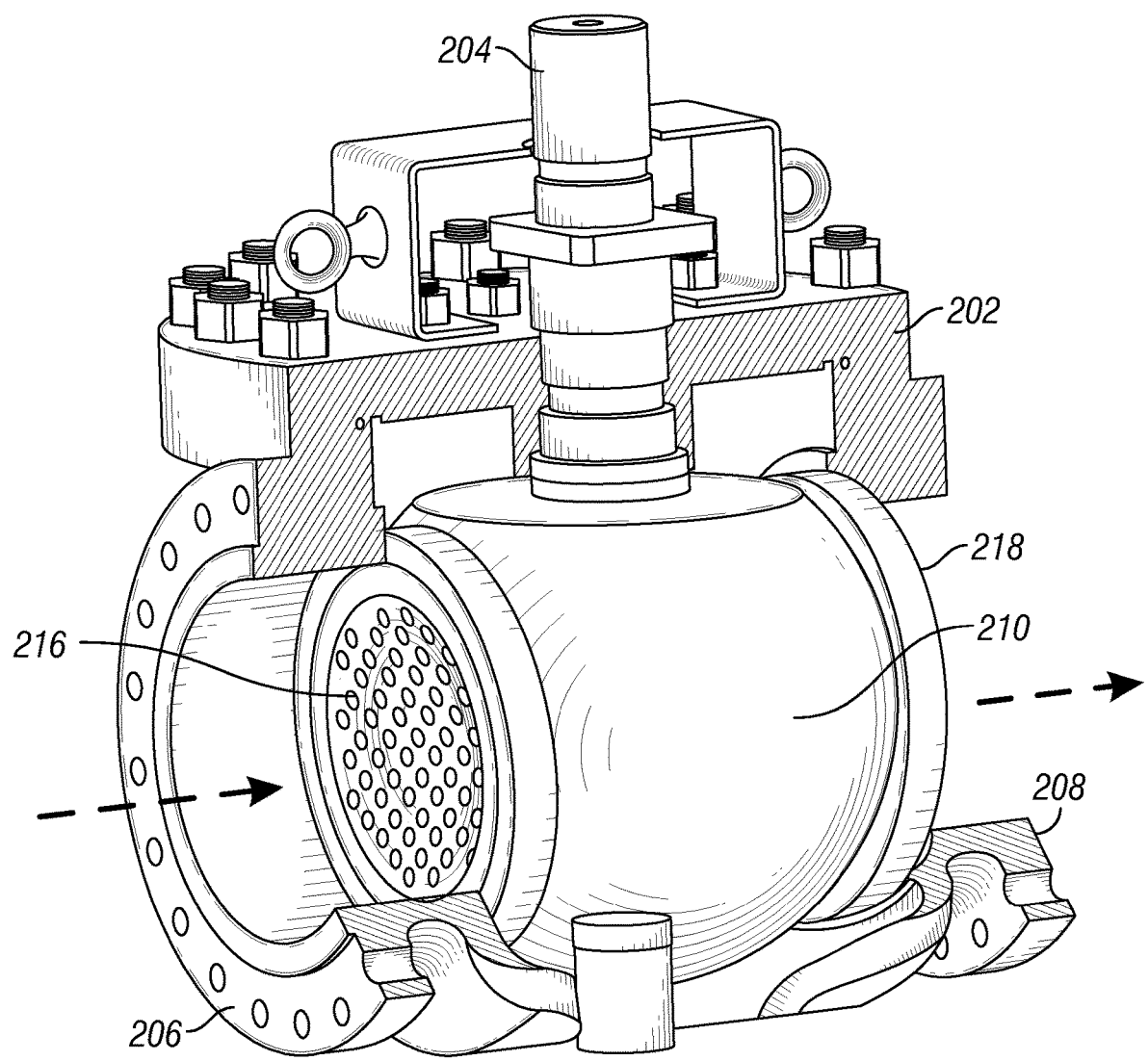
FIG. 3 is a perspective sectional view of a steam hammering suppression device, according to an embodiment of the disclosure.

FIG. 3 shows a perspective sectional view of a steam hammering suppression device 200, according to an embodiment of the disclosure. The steam hammering suppression device can be utilized when the transporting fluid includes steam or condensates, or both. A linear fluid flow path (shown as the thick arrow) extends through the longitudinal axis of steam hammering suppression device 200. The steam hammering suppression device 200 includes a substantially spherically shaped plug 210 rotatably positioned in a substantially spherically shaped hollow space of a valve body 202. The plug 210 is rotatable along a transverse axis extending through the center of a stem 204. The lower end of the stem 204 is fixedly connected to the plug 210. Optionally, an actuator (not shown) can be coupled to the upper end of the stem 204 to cause rotation of the stem 204, either in the clockwise or counterclockwise direction. The rotation of the stem 204 can be in a 45 degree or 90 degree interval.

The valve body 202 includes two flanges 206, 208 for connecting steam hammering suppression device 200 to external piping (not shown) with mating flanges. The two flanges 206, 208 have substantially the same inner diameter. One skilled in the art would recognize that the steam hammering suppression device 200 can be in the absence of flanges. In some embodiments, the inlet and outlet of the steam hammering suppression device 200 can be internally threaded or externally threaded for connecting the steam hammering suppression device 200 to external piping (not shown) with mating threads. In some embodiments, the inlet and outlet of the steam hammering suppression device 200 can be connected to external piping (not shown) via compression fittings or any other suitable coupling means.

The plug 210 can include corrosion resistant and abrasion resistant material, such as stainless steel. The plug 210 includes two steam hammering suppression openings 216, 218. The two steam hammering suppression openings 216, 218 are also positioned opposite to each other. The two steam hammering suppression openings 216, 218 correspond to a fluid flow path used when steam hammering is detected or is likely to happen. In this manner, the steam hammering suppression device 200 can be switched between closed mode and steam hammering suppression mode by rotating the stem 204 at about a 90 degree interval, either clockwise or counterclockwise.

Each of the two steam hammering suppression openings 216, 218 includes a substantially circular plate having a plurality of orifices. The circular plate has substantially the same diameter as of the inner diameter of the two flanges

206, 208. In some embodiments, the circular plate has a concave or convex geometry along the longitudinal axis. The existence of the orifices allows reduction of surge pressure when steam passes the fluid flow path. Advantageously, there is no reduction of steam flow during steam hammering suppression mode. The number and size of each orifice included in the circular plate can vary depending on the estimated pressure and flow of the steam passing within the pipeline and the maximum pressure drop allowed during normal operation.

In some embodiments, multiple steam hammering suppression devices 200 can be installed along a pipeline at various locations separated by various distances. The length of the pipeline can be less than about 1,000 kilometers (km), alternately less than about 100 km, alternately less than about 10 km, alternately less than about 1 km, or alternately less than about 100 m.

In some embodiments, the steam hammering suppression device 200 can be retrofitted by replacing an existing ball of an in-line ball valve with the plug 210.

Figure 4:
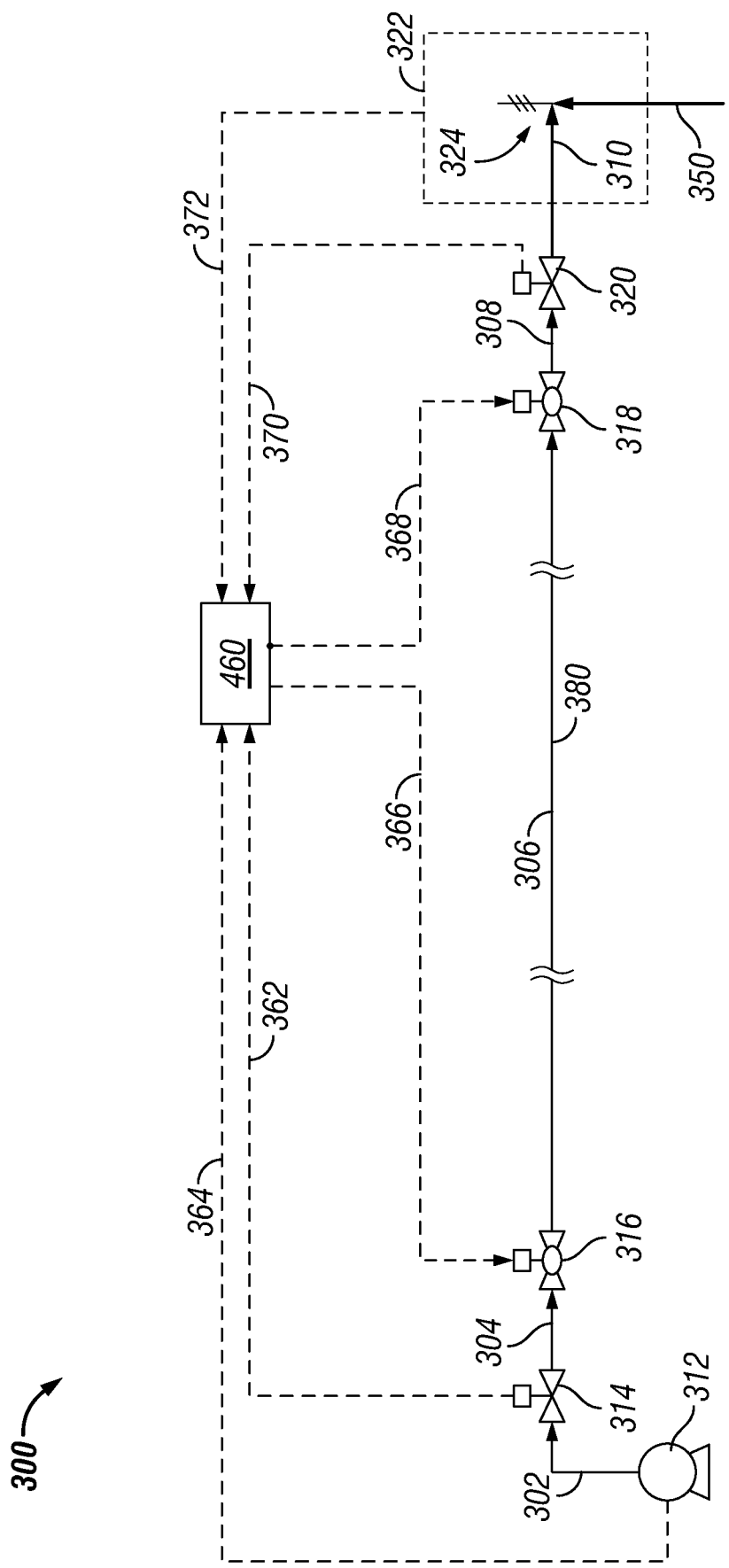
FIG. 4 is a schematic diagram of a surge suppression system for introducing water into a hydrocarbon reservoir, according to an embodiment of the disclosure.

FIG. 4 shows a surge suppression system 300 for introducing water into a hydrocarbon reservoir, according to an embodiment of the disclosure. The surge suppression system includes a water feed (not shown) and a water sink 350. In some embodiments, the water feed can be a water plant. In some embodiments, the water sink 350 can be a subterranean hydrocarbon reservoir. A pipeline 380 fluidly connects the water feed and the water sink 350.

A pump 312 is fluidly connected downstream of the water feed to produce water stream 302. The pump 312 can be any type of pump capable of controlling the flow rate of water stream 302. Water stream 302 is passed to a shutdown valve 314 to produce water stream 304. The shutdown valve 314 can be any type of valve capable of reducing the flow rate of water stream 302 and ultimately shutting down water stream 304.

Water stream 304 is passed to a first surge suppression device 316 to produce water stream 306. The first surge suppression device 316 has features substantially similar to that of the surge suppression device 100 as shown in FIGS. 2A, 2B, and 2C. The first surge suppression device 316 can be switched between normal operation mode and surge suppression mode as shown in FIGS. 2A and 2B. Alternately, the first surge suppression device 316 can have features substantially similar to that of the steam hammering suppression device 200 as shown in FIG. 3 in instances where steam is the predominant fluid passing the pipeline.

Water stream 306 is passed to a second surge suppression device 318 to produce water stream 308. The second surge suppression device 318 has features substantially similar to that of the surge suppression device 100 as shown in FIGS. 2A, 2B, and 2C. The second surge suppression device 318 can be switched between normal operation mode and surge suppression mode as shown in FIGS. 2A and 2B. Alternately, the second surge suppression device 318 can have features substantially similar to that of the steam hammering suppression device 200 as shown in FIG. 3 in instances where steam is the predominant fluid passing the pipeline.

One skilled in the art would recognize that a single surge suppression device can be installed along the pipeline 380 at various locations. One skilled in the art would also recognize that more than two surge suppression devices can be installed along the pipeline 380 at various locations separated by various distances. Locations across the pipeline network where the one or more surge suppression devices are to be installed can be determined via dynamic simulation.

Water stream 308 is passed to a well isolation valve 320 to produce water stream 310. The well isolation valve 320 can be any type of valve capable of reducing the flow rate of water stream 308 and ultimately shutting down water stream 310. Water stream 310 is introduced into the water sink 350 through a wellhead 322 located at a water injection site. The wellhead 322 includes a choke valve 324. The choke valve 324 can be any type of choke valve capable of controlling water injection into the water sink 350 from water stream 310.

In some embodiments, the surge suppression system 300 includes a surge controller 360. The surge controller 360 is electronically connected to each of the pump 312, the shutdown valve 314, the first surge suppression device 316, the second surge suppression device 318, the well isolation valve 320, and the wellhead 322, via connections 362, 364, 366, 368, 370, 372, respectively. Each of the pump 312, the shutdown valve 314, the well isolation valve 320, and the wellhead 322 is configured to transmit a shutdown signal to the surge controller 360 when a shutdown occurs or is likely to occur. The surge controller 360 is configured to transmit an operation signal to each of the first surge suppression device 316 and the second surge suppression device 318 such that each of the first surge suppression device 316 and the second surge suppression device 318 can be remotely switched between normal operation mode and surge suppression mode by rotating the plug 110 as shown in FIGS. 2A, 2B, and 3.

The surge controller 360 is configured to minimize differential pressure during normal operation and is operated when a pressure surge occurs or is likely to occur. Otherwise, the first surge suppression device 316 and the second surge suppression device 318 are maintained at normal operation mode during normal operation or scraping events. Alternately, the first surge suppression device 316 and the second surge suppression device 318 can be maintained at surge suppression mode during normal operation.

In an example embodiment of the method, a shutdown event is detected by any of the pump 312, the shutdown valve 314, the well isolation valve 320, and the wellhead 322. A shutdown signal is transmitted to the surge controller 360. The surge controller 360 transmits an operational signal to the first surge suppression device 316 and the second surge suppression device 318. Each of the first surge suppression device and the second surge suppression device is remotely switched from normal operation mode to surge suppression mode by rotating the stem 104, and accordingly the plug 110, 90 degrees, either clockwise or counterclockwise.

Figure 5:
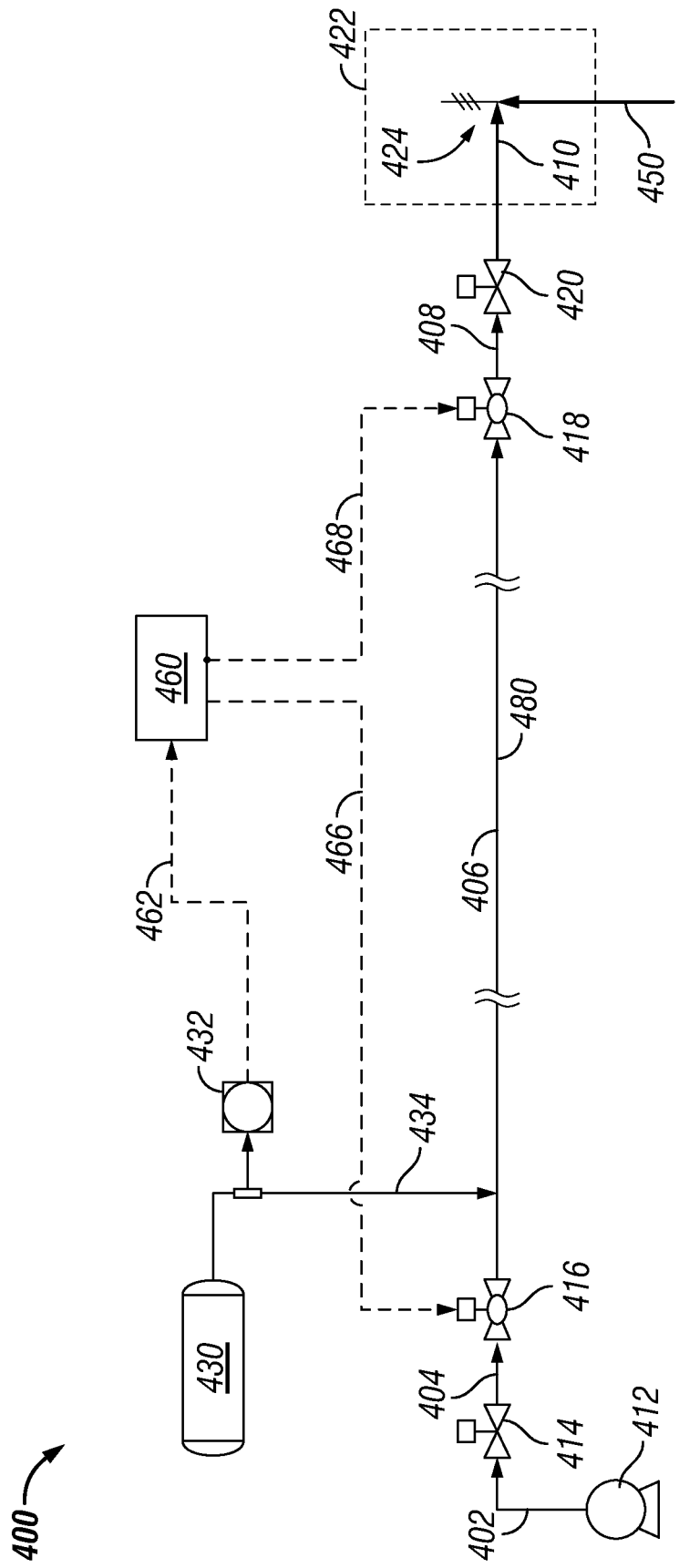
FIG. 5 is a schematic diagram of a surge suppression system for introducing water into a hydrocarbon reservoir, according to an embodiment of the disclosure.

FIG. 5 shows a surge suppression system 400 for introducing water into a hydrocarbon reservoir, according to an embodiment of the disclosure. The surge suppression system includes a water feed (not shown) and a water sink 450. In some embodiments, the water feed can be a water plant. In some embodiments, the water sink 450 can be a subterranean hydrocarbon reservoir. A pipeline 480 fluidly connects the water feed and the water sink 450.

A pump 412 is fluidly connected downstream of the water feed to produce water stream 402. The pump 412 can be any type of pump capable of controlling the flow rate of water stream 402. Water stream 402 is passed to a shutdown valve 414 to produce water stream 404. The shutdown valve 414 can be any type of valve capable of reducing the flow rate of water stream 402 and ultimately shutting down water stream 404.

Water stream 404 is passed to a first surge suppression device 416 to produce water stream 406. The first surge suppression device 416 has features substantially similar to that of the surge suppression device 100 as shown in FIGS. 2A, 2B, and 2C. The first surge suppression device 416 can be switched between normal operation mode and surge suppression mode as shown in FIGS. 2A and 2B.

Water stream 406 is passed to a second surge suppression device 418 to produce water stream 408. The second surge suppression device 418 has features substantially similar to that of the surge suppression device 100 as shown in FIGS. 2A, 2B, and 2C. The second surge suppression device 418 can be switched between normal operation mode and surge suppression mode as shown in FIGS. 2A and 2B.

One skilled in the art would recognize that a single surge suppression device can be installed along the pipeline 480 at various locations. One skilled in the art would also recognize that more than two surge suppression devices can be installed along the pipeline 480 at various locations separated by various distances.

Water stream 408 is passed to a well isolation valve 420 to produce water stream 410. The well isolation valve 420 can be any type of valve capable of reducing the flow rate of water stream 408 and ultimately shutting down water stream 410. Water stream 410 is introduced into the water sink 450 through a wellhead 422 located at a water injection site. The wellhead 422 includes a choke valve 424. The choke valve 424 can be any type of choke valve capable of controlling water injection into the water sink 450 from water stream 410.

In some embodiments, the surge suppression system 400 includes a surge controller 460. The surge controller 460 is electronically connected to each of the first surge suppression device 416 and the second surge suppression device 418 via connections 466 and 468, respectively. The surge controller 460 is also electronically connected to a scraper detector 432 via connection 462. The scraper detector 432 is configured to transmit a scraping operation signal to the surge controller 460 when a scraper or a pipeline pig (not shown) is launched from a scraper launcher 430 via pipeline 434 and is detected by the scraper detector 432. The surge controller 460 is configured to transmit an operation signal to each of the first surge suppression device 416 and the second surge suppression device 418 such that each of the first surge suppression device 416 and the second surge suppression device 418 can be remotely switched between normal operation mode (corresponding to scraping mode) and surge suppression mode by rotating the plug 110 as shown in FIGS. 2A and 2B.

In an example embodiment of the method, the scraper launcher 432 launches a scraper into the pipeline 480. The scraper detector 432 detects the launch of the scraper. A scraping operation signal is transmitted to the surge controller 460. If the surge suppression system 400 is already in normal operation mode, no operation signals are transmitted to the first surge suppression device 416 and the second surge suppression device 418. On the other hand, if the surge suppression system 400 is in surge suppression mode, the surge controller 460 transmits an operational signal to the first surge suppression device 416 and the second surge suppression device 418. Each of the first surge suppression device and the second surge suppression device is remotely switched from surge suppression mode to normal operation mode (that is, scraping mode) by rotating the stem 104, and accordingly the plug 110, 90 degrees, either clockwise or counterclockwise.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A surge suppression system for transporting water through a pipeline, the surge protection system comprising:
   a water feed;
   a pump, the pump fluidly connected downstream of the water feed;
   a first surge suppression device, the first surge suppression device fluidly connected downstream of the pump;
   a second surge suppression device, the second surge suppression device fluidly connected downstream of the first surge suppression device via the pipeline;
   a water sink, the water sink fluidly connected downstream of the second surge suppression device; and
   a surge controller, the surge controller electronically connected to the pump, the first surge suppression device, and the second surge suppression device, the surge controller configured to receive a shutdown signal from the pump, the surge controller configured to transmit an operation signal to the first surge suppression device and the second surge suppression device such that each of the first surge suppression device and the second surge suppression device is remotely switched between a normal operation mode and a surge suppression mode.

2. The surge suppression system of claim 1, further comprising:
   a shutdown valve, the shutdown valve fluidly connected downstream of the pump and upstream of the first surge suppression device, the surge controller electronically connected to the shutdown valve and configured to receive a shutdown signal from the shutdown valve.

3. The surge suppression system of claim 1, further comprising:
   a well isolation valve, the well isolation valve fluidly connected downstream of the second surge suppression device and upstream of the water sink, the surge controller electronically connected to the well isolation valve and configured to receive a shutdown signal from the well isolation valve.

4. The surge suppression system of claim 1, further comprising:
   a wellhead, the wellhead fluidly connected downstream of the second surge suppression device and upstream of the water sink, the surge controller electronically connected to the wellhead and configured to receive a shutdown signal from the wellhead.

5. The surge suppression system of claim 1, further comprising:
   a scraper launcher, the scraper launcher fluidly and peripherally connected to the pipeline, the scraper launcher configured to launch a scraper into the pipeline during the normal operation mode for a scraping operation; and a scraper detector, the scraper detector configured to transmit a scraping signal to the surge controller as the scraper passes the scraper detector.

6. The surge suppression system of claim 1, wherein each of the first surge suppression device and the second surge suppression device comprises:

a valve body, the valve body including a substantially spherical hollow space; and a plug, the plug being substantially spherical and rotatably positioned in the substantially spherical hollow space of the valve body, the plug comprising two surge suppression openings, the two surge suppression openings defining a first fluid flow path corresponding to the surge suppression mode.

7. The surge suppression system of claim 6, wherein each of the first surge suppression device and the second surge suppression device further comprising:

a stem, the stem fixedly connected to the plug, wherein the plug is rotatable along an axis extending through a center of the stem.

8. The surge suppression system of claim 6, wherein the plug further comprises two full-bore openings, the two full-bore openings defining a second fluid flow path corresponding to the normal operation mode.

9. The surge suppression system of claim 8, wherein the first fluid flow path and the second fluid flow path are switchable by rotating the plug in a 90 degree interval.

10. The surge suppression system of claim 6, wherein each of the two surge suppression openings comprises a circular plate having a plurality of orifices, wherein the plurality of orifices allows reduction of surge pressure when the water passes the first fluid flow path.

11. The surge suppression system of claim 10, wherein the circular plate has a concave or convex geometry.

12. A method for controlling a pressure surge during water transport through a pipeline, the method comprising the steps of:

detecting, via a surge controller, a shutdown signal provided by a pump, wherein the pump is fluidly connected downstream of a water feed;

transmitting, via the surge controller, an operational signal to a first surge suppression device and a second surge suppression device such that each of the first surge suppression device and the second surge suppression device is remotely switched from a normal operation mode to a surge suppression mode, wherein the first surge suppression device is fluidly connected downstream of the pump, wherein the second surge suppression device is fluidly connected downstream of the first surge suppression device via the pipeline, wherein a water sink is fluidly connected downstream of the second surge suppression device.

13. The method of claim 12, wherein the detecting step further includes detecting a shutdown signal provided by a shutdown valve, wherein the shutdown valve is fluidly connected downstream of the pump and upstream of the first surge suppression device.

14. The method of claim 12, wherein the detecting step further includes detecting a shutdown signal provided by a well isolation valve, wherein the well isolation valve is fluidly connected downstream of the second surge suppression device and upstream of the water sink.

15. The method of claim 12, wherein the detecting step further includes detecting a shutdown signal provided by a wellhead, wherein the wellhead is fluidly connected downstream of the second surge suppression device and upstream of the water sink.

16. The method of claim 12, further comprising the step of:

transmitting, via the surge controller, an operational signal to the first surge suppression device and the second surge suppression device such that each of the first surge suppression device and the second surge suppression device is remotely switched from the surge suppression mode to the normal operation mode.

17. The method of claim 12, wherein each of the two surge suppression openings comprises a circular plate having a plurality of orifices, wherein the plurality of orifices allows reduction of surge pressure when the water passes the first fluid flow path.

18. The method of claim 17, wherein the circular plate has a concave or convex geometry.

19. The method of claim 12, wherein each of the first surge suppression device and the second surge suppression device comprises:

a valve body, the valve body including a substantially spherical hollow space; and a plug, the plug being substantially spherical and rotatably positioned in the substantially spherical hollow space of the valve body, the plug comprising two surge suppression openings, the two surge suppression openings defining a first fluid flow path corresponding to the surge suppression mode.

20. The method of claim 19, wherein each of the first surge suppression device and the second surge suppression device further comprising:

a stem, the stem fixedly connected to the plug, wherein the plug is rotatable along an axis extending through a center of the stem.

21. The method of claim 19, wherein the plug further comprises two full-bore openings, the two full-bore openings defining a second fluid flow path corresponding to the normal operation mode.

22. The method of claim 21, wherein the first fluid flow path and the second fluid flow path are switchable by rotating the plug in a 90 degree interval.

23. A method for mitigating a pressure surge during water transport through a pipeline, the method comprising the steps of:

detecting the pressure surge in the pipeline;

suppressing the pressure surge using an in-line surge suppression device, the in-line surge suppression device comprising:

a valve body, the valve body including a substantially spherical hollow space; and a plug, the plug being substantially spherical and rotatably positioned in the substantially spherical hollow space of the valve body, the plug comprising two surge suppression openings, the two surge suppression openings defining a first fluid flow path; each of the two surge suppression openings comprising a circular plate having a plurality of orifices, wherein the plurality of orifices is configured to allow reduction of the surge pressure when water passes the first fluid flow path, wherein fluid flow rate is maintained due to an increase of differential pressure across the plurality of orifices.

24. The method of claim 23, wherein the circular plate has a concave or convex geometry.

25. The method of claim 23, wherein the in-line surge suppression device further comprises a stem, the stem fixedly connected to the plug, wherein the plug is rotatable along an axis extending through a center of the stem.

26. The method of claim 23, wherein the plug further comprises two full-bore openings, the two full-bore openings defining a second fluid flow path.

27. The method of claim 26, wherein the suppressing step includes rotating the plug in a 90 degree interval such that the second fluid flow path is switched to the first fluid flow path.

* * * * *